June 5, 1934.   R. L. WEGEL   1,961,410
SOUND ENERGY TRANSLATING APPARATUS
Filed March 31, 1932   3 Sheets-Sheet 2
FIG. 4
FIG. 4A
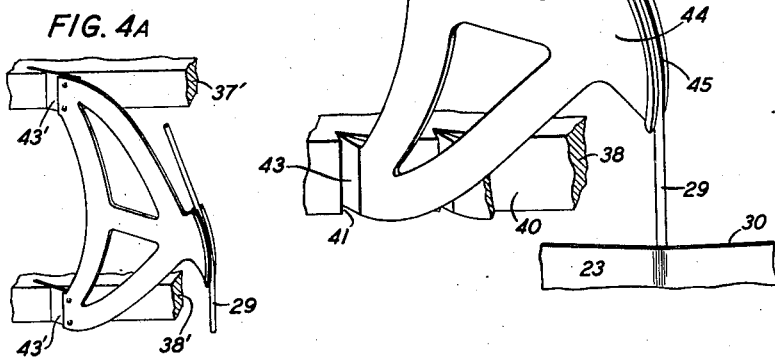
FIG. 5
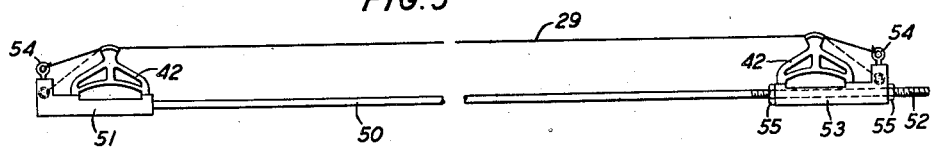
FIG. 7
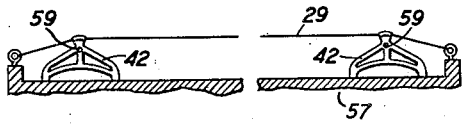
FIG. 6
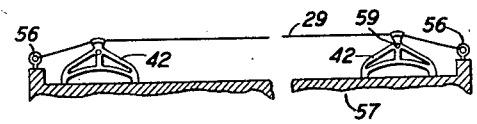
FIG. 7A
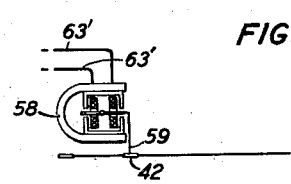
FIG. 6A
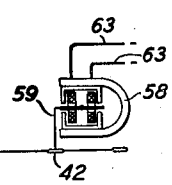
INVENTOR
R. L. WEGEL
BY
Walter C. Kiesel
ATTORNEY June 5, 1934.    R. L. WEGEL    1,961,410
SOUND ENERGY TRANSLATING APPARATUS
Filed March 31, 1932    3 Sheets-Sheet 3
FIG.8
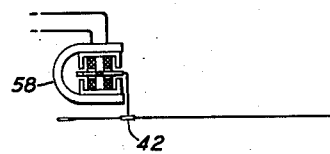
FIG.9
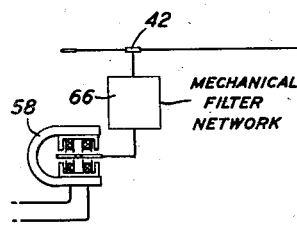
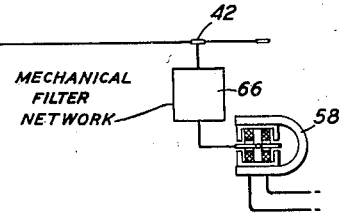
FIG.10
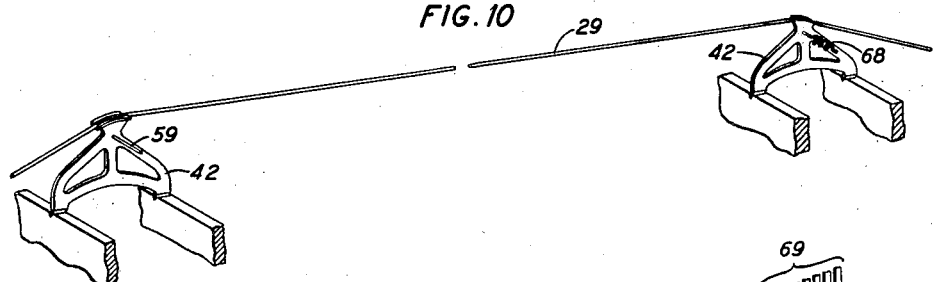
FIG.11
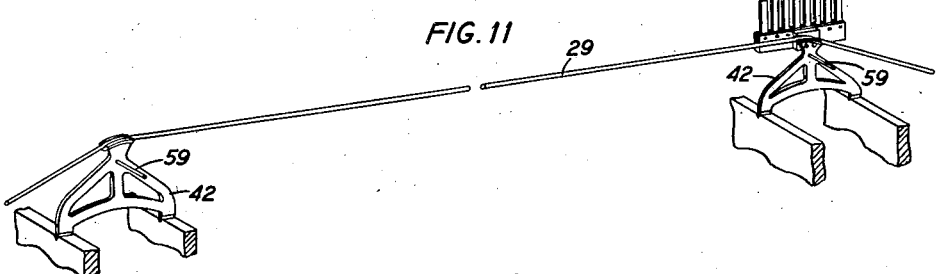
FIG.12
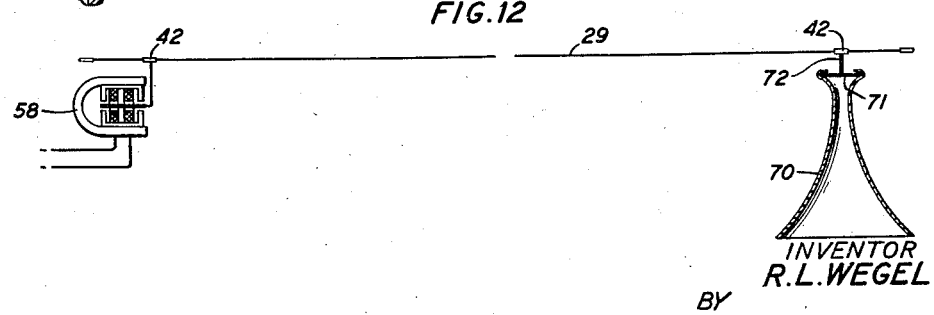
INVENTOR
R.L.WEGEL
BY
Walter C. Kiesel
ATTORNEY Patented June 5, 1934

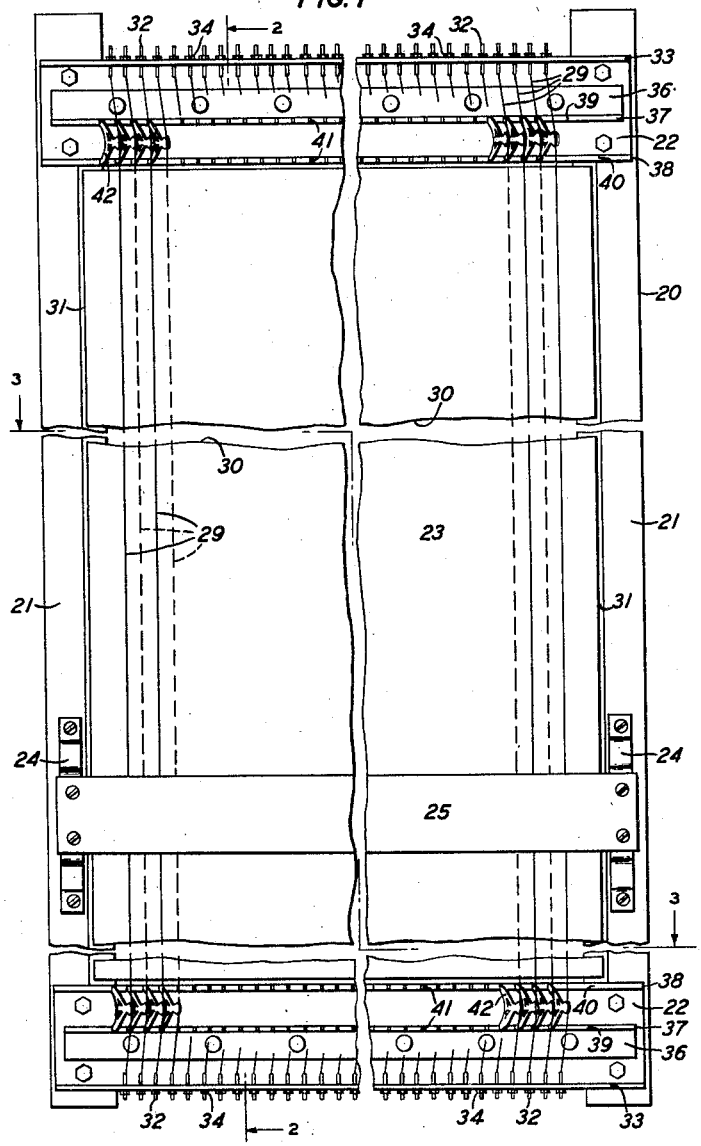
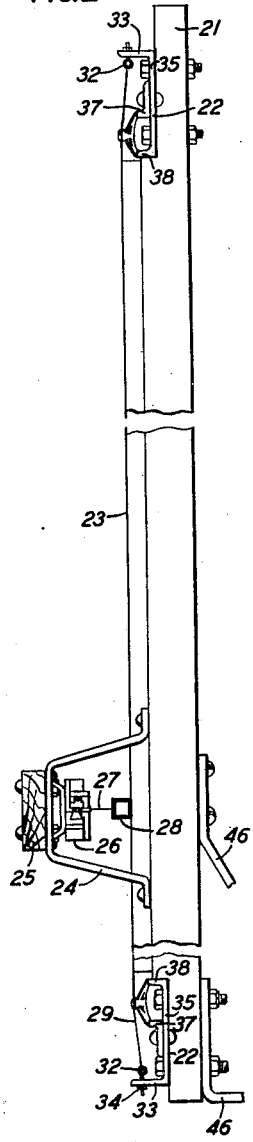
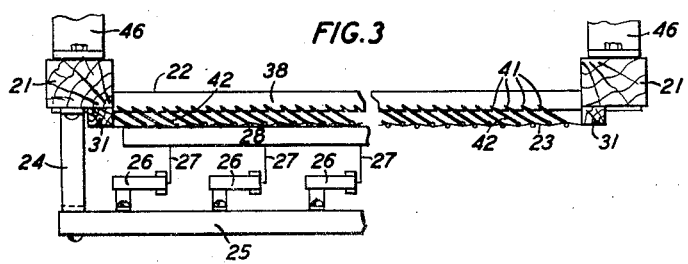
INVENTOR
R. L. WEGEL
BY
Walter C. Kiesel
ATTORNEY

1,961,410

UNITED STATES PATENT OFFICE 1,961,410

SOUND ENERGY TRANSLATING APPARATUS

Raymond L. Wegel, New York, N. Y., assignor to Bell Telephone Laboratories, Incorporated, New York, N. Y., a corporation of New York Application March 31, 1932, Serial No. 602,206

20 Claims. (Cl. 84—192)

This invention relates to apparatus for translating sound energy and more particularly to such apparatus in which wires or strings are employed as a means for translating the sound energy.

One object of this invention is to so terminate an elongated element, such as a wire or string, employed as a means for translating sound energy that any desired load having any predetermined characteristics may be applied at either or each end of the element.

A further object of this invention is to so terminate an elongated sound energy translating element that such element may vibrate at low frequencies with substantially no reflection of energy from its extremities or formation of standing waves therein.

A feature of this invention resides in an energy translating system or device comprising an elongated element having adjacent one or each extremity a bridge member upon which it rests and which is movable with the element.

In accordance with this invention an elongated sound energy translating element, such as a stretched wire or string, which is attached preferably to some other member at each of its extremities or ends, is provided adjacent one or each of its extremities with means which, for slow or low frequency movements of the element, allows the latter to move substantially as if it were free at its extremities.

In accordance with this invention, also, this means may be associated with other elements or structure so that a desired load of predetermined characteristics may be provided at one extremity of the elongated element.

In one embodiment, the terminating means comprises a substantially triangular-shaped member of desired dimensions whose base apex portions are provided with projections fitting into and adapted for movement relative to depressions in a support for said means, and whose other apex is provided with a grooved or slotted portion in which the elongated element rests after being attached at its extremities to a suitable support.

A more complete understanding of this invention will be obtained from the detailed description which follows taken in conjunction with the appended drawings, wherein:

Fig. 1 is an elevational view of a sound reproducing device embodying this invention;

Fig. 2 is a side elevational view of the device shown in Fig. 1;

Fig. 3 is a fragmentary view of the device of Fig. 1 along the line 3—3 thereof;

Fig. 4 is a view of an embodiment of the elongated element terminating or bridge member comprised in this invention;

Fig. 4A is a view of an alternative embodiment of the bridge member of Fig. 4;

Fig. 5 shows an alternative tensioning means for a wire or string and terminating bridge member arrangement similar to that of Fig. 1;

Fig. 6 shows a wire secured at its ends to a support and passing over a bridge member near each of the ends, a connecting member or rod being connected to one bridge;

Fig. 6A is a schematic of the arrangement of Fig. 6 and shows an electromechanical transducer connected to one of the bridge members through a connecting member;

Fig. 7 shows an arrangement similar to that of Fig. 6 except that a connecting member or rod is attached to each bridge member;

Fig. 7A is a schematic of the arrangement of Fig. 7 and shows an electromechanical transducer connected to each bridge member through a connecting member;

Fig. 8 is a schematic of an arrangement similar to that of Fig. 7A except that a damping element is associated with one of the terminating or bridge members;

Fig. 9 is a schematic of an arrangement similar to that of Fig. 7A except that a mechanical filter network is associated with each of the terminating members between it and an electromechanical transducer;

Fig. 10 shows in perspective an elongated element or wire and terminating members in accordance with this invention, one of said members having a damping element associated therewith;

Fig. 11 shows in perspective another embodiment of this invention in which one of the terminating members is loaded by attaching thereto a plurality of reeds; and Fig. 12 is a schematic showing of an elongated element having bridge members near its ends, an electromechanical transducer being connected to one bridge and a diaphragm and horn loading the other bridge.

In Figs. 1, 2 and 3, there are shown views of a sound energy translating device, in the form of a sound reproducer, embodying this invention. A frame 20 comprising lateral uprights 21 and horizontal channel-shaped members 22 provides a support for a diaphragm 23 and for brackets 24. A cross-bar or support 25 for a plurality of electromechanical transducers 26 is mounted on these brackets. The transducers are shown as of the electromagnetic type although those of the electrodynamic type may be used, and actuate the diaphragm through vibratory connecting members or rods 27 attached to a tubular member 28 secured to and across one face of the diaphragm substantially along a line. Of course, a line drive of the electrodynamic type may be employed. The diaphragm comprises a plurality of parallel, spaced, elongated, individually stretched elements 29 of wire or string, for instance, of a metal such as duralumin, or other suitable material, and a sheet or sheets of thin material 30, preferably imperforate to air, for instance, of paper. This thin material is secured to the elements by a suitable adhesive so that the elements are all on one surface of the thin material or so that alternate elements are on opposite sides of the thin material. The latter arrangement is shown in Fig. 1. The lateral edge portions of the diaphragm are fastened, preferably, to the ledges 31, 31 of the uprights 21 and in this way a lateral tension may be introduced in the diaphragm if desired. The ends or extremities of each element 29 are terminated at eyebolts 32 which thread through tapped drillings in the horizontal legs or extensions 33 of the channels 22 and are engaged by nuts 34. Before the material 30 is secured to the elements 29, the latter may be tensioned to any desired degree, each to the same degree or each to a different degree, by adjustment of the nuts 34. Suitably secured, as by rivets, to the base 35 of each channel 22 is an angle piece 36 whose leg portion 37 extends parallel to the leg portion 38 of the channel 22. The surfaces 39 and 40 of the leg portions 37 and 38, respectively, are in the same plane preferably and are provided with a plurality of equally spaced indentations, depressions, or recesses 41, the recesses in one surface being in line with the recesses in the other surface. A terminating or bridge member 42 supported by the leg portions 37 and 38 is positioned near each extremity of each element 29. This terminating member is shown in enlarged detail in Fig. 4. It is roughly triangular in shape, the lower base apex portions being in the form of knife edge portions 43 fitting into a pair of recesses 41, and its other apex being in the form of an enlarged portion 44 having a groove or slot 45 therein in which the element 29 rests. To reduce its mass, the bridge may comprise a framework as shown. The bridge member is disposed at an angle, preferably to the plane of the surfaces 39 and 40 and is adapted for oscillatory movement on its knife edge apices in the recesses 41. Fig. 4A shows an alternative form for the bridge member. Instead of having the base apices of the bridge member comprise knife edge portions, weak spring portions 43' are secured, for instance, by rivets, to the bridge at its base apex portions and are embedded in the leg portions 37' and 38'. When subjected to an actuating force, the bridge will oscillate on these spring portions. The brackets 46, shown fragmentarily, maintain the structure described above in a vertical or upright position. Of course, the sound reproducer may be supported or suspended in any position or manner desired.

In R. L. Wegel Patent 1,870,271, issued August 9, 1932, there is disclosed a sound translating diaphragm comprising a plurality of spaced, parallel, elongated, individually stretched elements or wires to which is secured some thin material preferably imperforate to air. In such a diaphragm, the tensioned elements are rigidly terminated at their extremities and thus have mechanical open circuits. In an instrument such as a piano, where a plurality of stretched wires is employed, such terminations and the resultant reflection of energy therefrom are desirable, this being of importance in the production of the musical tone. In a diaphragm of the type disclosed in the Wegel patent referred to above, such rigid terminations, without modification, are undesirable inasmuch as lower frequency vibrations traversing the diaphragm are not sufficiently attenuated by the time they reach the extremities of the diaphragm and its elongated elements and are reflected, tending to produce standing waves in the diaphragm. Furthermore, for low frequencies, it is desirable that a sound translating diaphragm be capable of acting as much like a piston as possible in order that the reproduced sound evidence the quality of its original. A diaphragm with unmodified rigid terminations, however, is constrained against vibration as a piston and for substantially all frequencies, from the lowest to the highest, will act to a greater or less degree, as a wave transmission device. So far as the high frequencies are concerned, unmodified rigid terminations are not objectionable since the energy thereof is substantially entirely dissipated by the time the extremities of the stretched elements are reached, and the reflection occurring is of negligible consequence.

In accordance with this invention, the rigid terminations of the elongated elements are modified by the provision near each extremity thereof of the terminating or bridge member 42 described heretofore. When the diaphragm is actuated, it will tend to vibrate as a whole in response to the low frequencies since the rigid terminations at the eye-bolts 32 are substantially mechanically short-circuited, the bridge members oscillating on their knife edges, whereby the stretched elements along their length may move as a whole and the diaphragm, therefore, likewise. Of course, for the high frequencies, the diaphragm will tend to act as a wave transmission device and the oscillation of the bridges under the influence of the higher frequencies will be substantially negligible and not necessary for quality reproduction.

Fig. 5 shows a rod 50 having a stationary bridge supporting block 51 at one end and at its other and threaded end 52 a movable bridge supporting block 53. Bridge members 42, 42 are supported in upright position on each of the blocks 51 and 53 having drawn thereover an elongated element 29 which is rigidly terminated in the eye-bolts 54 carried by the bridge supporting blocks. The block 53 may be altered in position to thereby vary the tension in the element by adjustment of the nuts 55. If a low frequency force is applied to the element 29 at some point intermediate the bridges, the motion of the element will be communicated to the bridges which will tend to oscillate on their knife edges so that the element moves as though it were not terminated beyond the bridges, but connected to the bridges only. It is apparent that if a low frequency force is applied to one bridge member, the other bridge member will be caused to oscillate either in synchronism with—if the distance between the bridges is short—or in slightly lagging relation to—if the distance between the bridges is long—the first bridge. As shown, the ends of the elements are secured to the eye-bolts 54 at points considerably above the plane upon which the base apices of the bridge members rest or the extension of the line on which the knife edges rest. As indicated by the dotted lines, this termination may be extended at a point in such plane or on such line. Obviously, however, the point of termination of the ends of the element should not be in a plane below that on which the knife edge apices rest because the resultant force, when the bridges are displaced from their vertical position, will cause them to fall sideways. When the point of termination of each extremity of the element is in or above the plane of, or on or above the line of that on which the knife edge apices rest, the resultant force on the element when the bridges are caused to oscillate will be such as to tend to return the bridge to its original position at all times. This is true whether the bridges are in the position shown in Fig. 5, or those shown in Figs. 1 to 4. The elements 29 of the diaphragm are shown terminated above the supports of the bridges. It will be noted that the bridge members are capable of movement in a direction transverse only to that in which the elongated element extends.

In Figs. 6 and 6A there is shown a pair of terminating or bridge members 42, 42 over which an elongated element 29 is stretched, the element being rigidly terminated at 56 on a suitable support 57. An electromechanical transducer 58 is connected to one bridge member by a connecting member or rod 59 at one end attached to the bridge and at the other end attached to the vibratory armature 60 which is encircled by the current coils 61 and disposed between the pole pieces 62, 62 of the transducer. Vibrations communicated by the transducer 58 to the bridge 42 are transmitted to the other bridge and the latter will vibrate in a phase relation to the first bridge member as determined by the dimensions and mass of the element 29 and of the bridge members. As shown in Figs. 7 and 7A, a transducer 58 may be connected to each bridge member and the arrangement inserted in an electrical circuit as a transmission delay network, the electrical signal received at the one transducer over the lines 63, 63, being changed to a mechanical signal, transmitted between the bridge members to the other transducer, and there changed back to an electrical signal in the lines 63', 63'.

The vibrations transmitted by the arrangements of Figs. 7 and 7A may not only be delayed, but may be modified or otherwise controlled before or after they reach the electromechanical transducer that will transform them from the mechanical to the electrical state.

In Fig. 8, one bridge member has coupled to it a plunger 64 damped by a plurality of washers 65, of paper or metal, or other suitable material. Oil or hydraulic damping could be employed if desired.

In Fig. 9, a mechanical filter 66 is shown inserted between a bridge member and a transducer. The bridge member may comprise one element of the mechanical filter which is preferably of the band-pass type. In such an arrangement, the bridge movement will not be limited merely to actuating forces of low frequencies but it will respond to actuating forces of any frequency in the band which the filter is designed to pass.

In Fig. 10, one bridge is provided with a rod 59 and the other with a spring member 68, each of which is for connection with the moving element of a transducer.

In Fig. 11, a damping arrangement comprising a plurality of reeds 69 is attached to one bridge member, and in Fig. 12, a bridge member is loaded by a horn 70 and diaphragm 71 which latter is connected by the rod member 72 to the bridge member.

It is apparent that the terminating arrangement for a tensed element, as described above, permits not only of short-circuiting of the element at its end, but permits, also, of the application at the end of any desired load having any predetermined characteristics that might be required. The termination is capable of maintaining the tension in the element and is free, at the same time, to move in one direction transverse to the element and subject substantially to one restraint, which may be added arbitrarily. This restraint may comprise an actuating source of energy, for instance, the transducer 58 of Figs. 6 and 6A, the impedance, including the electrical load, of which as measured at the point of attachment of the connecting member 59, is predetermined relative to the transverse impedance of the element 29 in such a way as to attain any desired object, for example, zero transmission loss. The same considerations may be applied to the arrangement of Figs. 7 and 7A at each bridge. The added restraint, further, may comprise a predetermined mechanical impedance for the tensed element of Figs. 6 to 12 so as to control the phase and magnitude of a reflected or absorbed wave in any way desired, or to completely absorb incident energy propagated through the wire. For example, if the tensed wire is to be terminated so that the incident energy is completely absorbed, that is, to prevent reflection, the impedance added to the bridge must be equal to the characteristic impedance of the element, which, if internal and external dissipation in the transmission be neglected, is substantially a resistance equal to the product of the volume density of the material of the element, the velocity of propagation of a wave in the element, and the cross-sectional area of the wire, the velocity of propagation being equal to the square root of the ratio of the tension in the element to its linear density. The diaphragm of the sound reproducer of Figs. 1 to 3 may be terminated in its own impedance by applying the proper damping and reactive elements to the bridges to give the characteristic impedance of the diaphragm. Ideally fulfilled, this would result in no reflection of energy at the ends of the diaphragm. If the ideal condition is not desired, the terminating impedance may be so chosen as to produce any desired reflection condition.

Although the diaphragm of Figs. 1 to 3 is shown as driven intermediate its ends along a line across one face thereof, it is to be understood that the diaphragm may be driven by employing the bridge members as an integral part of the driving element.

The features of this invention have been disclosed in various specific structures. Nevertheless, it is to be understood that various modifications may be made in the details of construction without departing from the scope of the invention as defined in the appended claims.

What is claimed is:

1. Sound energy translating apparatus comprising a wire, means to which the ends of said wire are terminated, a member near each terminated end of the wire and having a base portion, said wire resting on said member, means to support said member, each member being oscillatory about its base as an axis, the wire being oscillatory therewith, means attached to one of said members to cause it to oscillate, and means attached to the other of said members to be actuated by said latter member.

2. Sound energy translating apparatus comprising a tensioned elongated element, means to which the ends of said element are secured, means for vibrating said element, and means adjacent one end of said element for applying thereat a desired load having predetermined characteristics, said means comprising a bridge member movable with said element when the latter is vibrating, the movement being transverse only to the direction in which said element extends, and means for detecting the vibration transmitted by the element.

3. Sound energy translating apparatus comprising means for changing electrical to mechanical energy, means for changing mechanical to electrical energy, and other means intermediate the two enumerated energy changing means for mechanically transmitting energy therebetween, said other means comprising a stretched elongated element and a member movable therewith, said member having a base portion and being oscillatable about said base portion as an axis.

4. Sound energy translating apparatus comprising an elongated element, means at one end of said element for vibrating it, means to which said element is attached at its other end, and a member over which said element passes near said attached end, said member being movable with said element when the latter is vibrating, said member being movable in a direction transverse only to the direction in which the element extends, and means connected to said member for detecting the vibration transmitted by the element.

5. Sound energy translating apparatus comprising a wire, means at one end of said wire for vibrating it, other means to which said wire is attached at its other end, and additional means near the attached end of said wire having a groove therein in which said wire rests, said additional means being supported so as to move with said wire when the latter is vibrated and being movable substantially at right angles only to the direction in which said wire extends, and means connected to said additional means for detecting the vibration transmitted by the wire.

6. Sound energy translating apparatus comprising a wire, means to which said wire is attached at each end, an oscillatable member adjacent one end of said wire and on which said wire rests, and means for supporting said member, the oscillatable member oscillating with the wire when the latter is vibrated, said movement being transverse only to the direction in which said wire extends.

7. Sound energy translating apparatus comprising an elongated vibration conducting element, means connected to said element adjacent one end thereof to cause said element to vibrate, means to which the other end of said element is attached, a bridge member having a base portion and being adjacent said other end of said element and on which said element rests, said bridge member being pivotally supported at its base portion and bodily movable with said element when the latter is vibrating, and electro-mechanical means connected to said bridge member for detecting such movement.

8. Sound energy translating apparatus comprising an elongated vibration conducting element, means connected to said element adjacent one end thereof to cause said element to vibrate, means to which the other end of said element is attached, a bridge member adjacent said other end of said element and on which said element rests, said bridge member being movable with said element, the movement of the bridge member being transverse only to the direction in which the element extends, and means connected to said bridge member for detecting such movement.

9. Sound energy translating apparatus comprising an elongated vibration conducting element, means to which the ends of said element are attached, and a bridge member adjacent one end of said element, said element resting thereon, said bridge member movable with said element when the latter is vibrating, the bridge member moving transverse only to the direction in which the elongated element extends.

10. Sound energy translating apparatus comprising a wire, means to which said wire is attached at each end, a member adjacent one end of said wire and on which said wire rests, and means for supporting said member, said member oscillatable on said means, said member movable with the wire on the latter's movement, said movement being transverse only to the direction in which said wire extends.

11. Sound energy translating apparatus comprising an elongated element having a plurality of terminations, means for vibrating said element, and means for effectively mechanically short-circuiting a termination of said element, said means comprising a member movable with said elongated element near such termination.

12. Sound energy translating apparatus comprising a stretched element having terminations, means for vibrating said element, means for effectively mechanically short-circuiting a termination of said element, said means comprising a member movable with said element near its termination, said element being drawn over said movable member, and means to which said element is attached.

13. Sound energy translating apparatus comprising an elongated element, means for vibrating said element, and means for effectively mechanically short-circuiting a termination of said element, said means comprising a member associated with said elongated element near its extremity and movable only in a direction transverse to that in which said elongated element extends.

14. Sound energy translating apparatus comprising an elongated element, means for vibrating said element, and other means near one extremity of said elongated element and in contact therewith, said other means comprising an inherently rigid member movable upon the vibration of said element in a direction transverse only to that in which said elongated element extends.

15. Sound energy translating apparatus comprising an elongated element, means for vibrating said element, and other means near one extremity of said element and in contact therewith, said other means comprising a pivotally supported frame member movable at right angles only to the direction in which said element extends, said element being drawn over said other means and rigidly secured therebeyond in the plane of the base of said other means.

16. Sound energy translating apparatus comprising a stretched element, means for vibrating said element, and means for effectively mechanically short-circuiting the terminals of said element, said means comprising oscillatable rigid frame members near the ends of the element and in contact with the element, said members oscillating in a direction transverse only to that in which the element extends.

17. A transmission delay network comprising an elongated element, movable members near the extremities of and over which said element is drawn, a support for said members, means to which the extremities of said elements are secured, means for impressing the signal to be transmitted upon said element, and means to which said signal is transmitted.

18. A sound reproducer comprising a plurality of elongated elements, and means effectively mechanically short-circuiting the terminals of said elements, said means comprising pivotally mounted members associated with said elements near their extremities, said members capable of movement at right angles only to the direction in which said elements extend.

19. A sound translating diaphragm comprising a plurality of elongated elements, means to which the ends of each element are secured, an oscillatory member near each end of each element, said member having a groove therein in which the elements rest, and means for vibrating said elements, said oscillatory member moving with said elements so that at the low frequencies, at least, the elements may move substantially bodily along their length.

20. Sound energy translating apparatus comprising a support, two bridge members spaced apart and carried by said support, and an elongated element fastened at each end to said support beyond said bridges and movable in response to impulses of sound wave frequency, said element extending over and resting on said bridges, said bridges being pivotally mounted and movable with said element.

RAYMOND L. WEGEL.